Aug. 29, 1967    L. H. HUTCHINS, JR    3,339,012
COMPOSITE STRANDED CONDUCTOR CABLE
Filed July 29, 1963
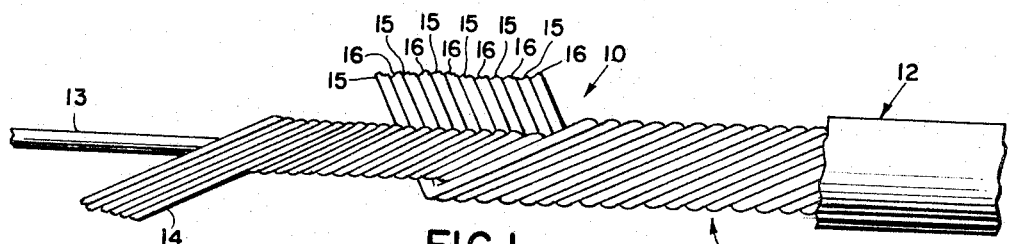
FIG.1
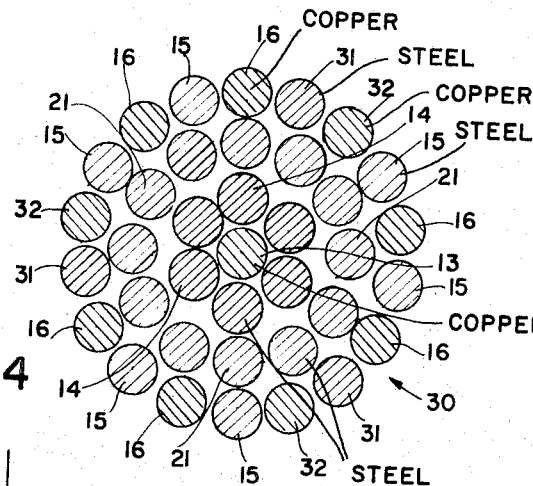
FIG.4
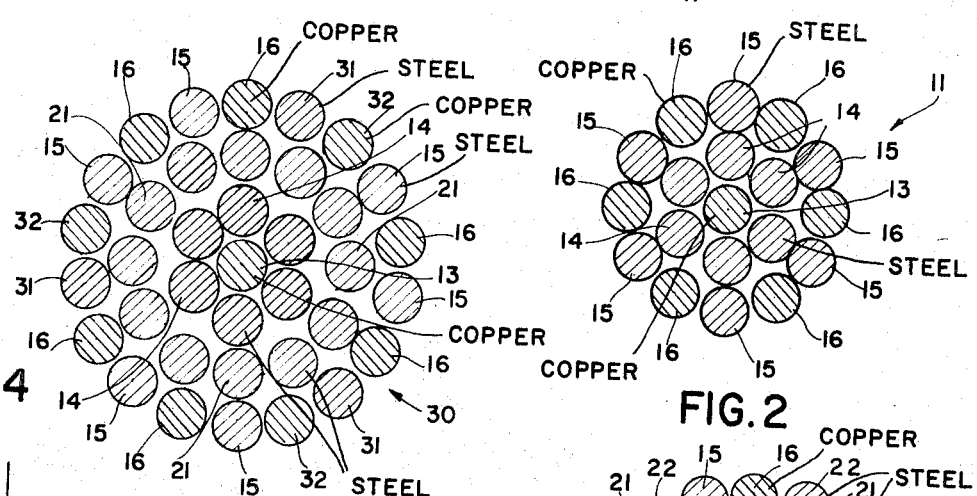
FIG.2
FIG.3
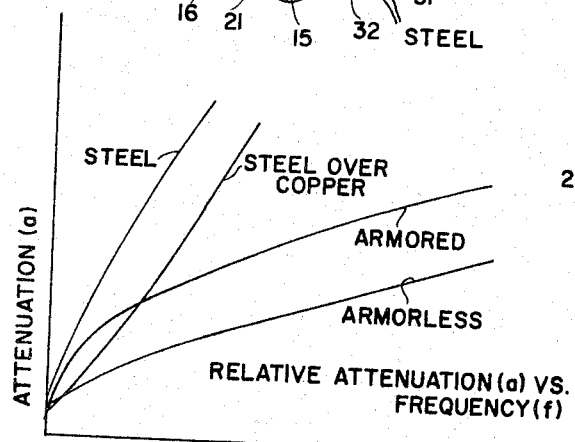
FIG.6
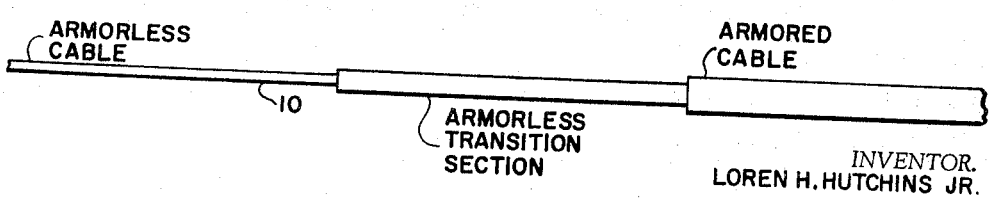
FIG.5
INVENTOR.
LOREN H. HUTCHINS JR.
BY
Adams, Forward and McLean
ATTORNEYS United States Patent Office 3,339,012
Patented Aug. 29, 1967

3,339,012
COMPOSITE STRANDED CONDUCTOR CABLE
Loren H. Hutchins, Jr., Hampton, N.H., assignor to Simplex Wire and Cable Company, Cambridge, Mass., a corporation of Massachusetts
Filed July 29, 1963, Ser. No. 299,681
6 Claims. (Cl. 174—128)

This is a continuation-in-part of Hutchins application Ser. No. 122,709, filed July 10, 1961, now abandoned.

This invention relates to composite stranded conductor cables. More particularly, it relates to armorless submarine cables particularly useful for purposes of transmission of telegraph signals.

For many years all submarine cables employed commercially required heavy steel armor wires both to provide mechanical protection and to provide the necessary strength to support the cable when being laid or otherwise required to span a long distance. The employment of such steel armor wires is undesirable due to resulting adverse electrical effects at telegraph-signal frequencies, the increase in weight of the cable per unit length, the decrease in flexibility of the cable and the high cost of manufacture of the cable. As pointed out in U.S. Patent No. 2,576,227, armorless cable is practicable utilizing polyethylene insulation provided adequate means are taken to insure the necessary tensile strength of the cable. In that patent, the necessary tensile strength is achieved by utilizing cadmium-copper alloy, central conducting elements to achieve a proper balance between conductivity and high tensile strength which will enable cable moduli in excess of 4.5. When, however, a submarine telegraph cable must be laid at extreme depths and cable moduli on the order of 8 or greater are required, the requisite tensile strength to achieve such a cable modulus exceeds that which can be practicably obtained utilizing cadmium-copper or similar high tensile strength, high conductivity alloys. In such a case, if armoring is to be avoided, to achieve the requisite cable modulus the conductor must of necessity include high tensile strength steel elements.

The employment of high tensile strength steel elements in an armorless submarine telegraph cable, however, presents significant problems, because of the appreciable inductive load increase caused by the employment of ferrous metals, because of the substantial increase in resistance of ferrous metals over resistance of copper and copper alloys ordinarily employed and because of the increase in weight of the conductor thereby required to achieve equivalent resistivity to that of copper with concomitant decrease in cable modulus.

It is therefore an important object of this invention to provide an armorless submarine telegraph cable and a suitable high tensile strength central conductor for such a cable for use at extreme depths where cable moduli on the order of 8 or greater are required.

In such a cable it will be further noted that for proper cable laying a specific gravity in sea water of 1.5 or greater is required. It is accordingly a further object of my invention to provide a cable construction achieving such a specific gravity.

It is also an important object of my invention to provide a composite conductor utilizing a high-tensile-strength steel while holding the A.C. resistance (measured at 1000 cycles per second) of the composite conductor to not more than 25% greater than the D.C. resistance and holding the A.C. inductance of the cable not substantially less than the D.C. inductance, i.e., not less than 0.30 millihenry per nautical mile (measured at 1000 cycles per second).

It is yet another object of this invention to provide such a conductor which, when desired, will have little or no tendency to twist under tension.

It is also a further object of this invention to provide a relatively flexible, light-weight submarine telegraph cable of simple construction meeting the above requirements.

These and other objects of this invention are essentially obtained utilizing a cable provided with a central composite conductor over which insulating material, such as polyethylene, has been extruded in which the conductor includes a plurality of strands of high tensile strength steel wire to obtain the necessary tensile strength to support the cable and a plurality of wire strands of copper or similar non-ferrous, highly conductive material to obtain the necessary conductivity for the cable. In accordance with this invention, the various strands of wire are disposed with one copper strand having a larger diameter than the remaining strands as a core about which an inner layer of steel strands is laid and about which an outer layer of strands of both metals is laid, the copper strands in the outer layer being symmetrically disposed relative to the core strand and in all cases separated from each other by a steel strand. By such a disposition of the various strands forming the composite conductor of the armorless submarine telegraph cable, the requisite low ratios of A.C. to D.C. resistance and of D.C. inductance to A.C. inductance are obtained.

In accordance with this invention, cable moduli of 8 and greater, with cable specific gravities of 1.5 and greater, are obtained by extruding a polyethylene or similar thermoplastic material about such a composite conductor having an inner layer of six strands and an outer layer of six steel and six copper strands.

It will be apparent, however, that as any armorless submarine cable approaches shore and must pass through shallow water, it must be spliced into a conventional armored cable for mechanical protection. In order to accomplish this, utilizing armorless cable in accordance with the present invention the necessary increase in diameter and strength of the armorless cable are obtained by employing transition armorless cable sections of increased strength and diameter.

On such transition cable section which can be utilized with the specific one-six-twelve cable above described deep-sea armorless cable includes the single copper center strand and inner strand of six steel wires, an intermediate layer of twelve steel strands and an outer layer of six copper strands and twelve steel strands, two such steel strands separating each such copper strand in the outer layer. Alternatively, the transition section between the deep-sea armorless cable and deep-sea armored cable can have the outer third layer of eighteen strands alternating copper and steel, dependent upon conductivity and strength requirements imposed on the transition section. The important point with regard to such transition sections, as well as the deep-sea armorless cable, is that the stranded, composite conductor contain all copper in its core strand and outer layer of strands and that the copper in the outer layer of strands have a steel strand on each side of it in order that high frequency resistance be at a minimum for the amounts of copper and steel in the conductor and in order that the negative slope of inductance as a function of frequency be minimized while obtaining the mechanical advantage of the high tensile strength steel elements.

It will be appreciated that when an armorless cable is to be connected to an armored cable, the armorless cable should tend to twist under tension similarly to the armored cable, which will normally twist under tension in a direction tending to unlay the armor wires. To this end the composite conductor of the armorless cable of this invention should have its various layers of strands laid in the same direction as the armor wires of any armored cable to which it is to be connected. In some instances, however, it is desirable to provide a cable lacking the tendency to twist under tension. While this can be achieved by opposing the direction of lay of various layers of a conductor and by substantially increasing the laying lengths of the outer layers of strands, the composite conductor of the present invention can be readily constructed with little or no tendency to twist without employing unusual laying lengths, since the outer layer contains all the strands, except the core strand, having low tensile strength and since at least half of the high tensile strength strands are in inner layers.

For a more complete understanding of the practical application of this invention, reference is made to the appended drawings in which:

FIGURE 1 is a fragmentary, partially cut-away and partially unlaid plan view of an armorless deep-sea telegraph cable in accordance with this invention;

FIGURE 2 is a cross-sectional view of the central conductor of the cable shown in FIGURE 1;

FIGURE 3 is a cross-sectional view of the central conductor of a transition cable section in accordance with this invention;

FIGURE 4 is a cross-sectional view of another transition cable section in accordance with this invention;

FIGURE 5 is a fragmentary plan view of a length of spliced cable; and

FIGURE 6 is a graph showing the transmission losses in differing cable conductor structures as a function of frequency.

Referring to FIGURE 1, the reference numeral 10 designates an armorless deep-sea telegraph cable constructed in accordance with this invention including a composite, stranded central conductor 11 about which an insulated covering 12 of material such as polyethylene has been extruded.

Referring also to FIGURE 2, it will be noted that composite conductor 11 includes a straight strand of soft drawn copper wire 13 which serves as a core for conductor 11. Six strands of high-tensile-strength steel wire 14 are laid helically about central strand 13 to form an inner layer of strands. Six high-tensile-strength steel wire strands 15 and six soft-drawn copper-wire strands 16 are alternately laid helically about the inner layer of strand 14 to form an outer layer of twelve strands, as shown in FIGURE 2, in which each copper strand 16 in the outer layer is adjacent only to steel strands 15 and 14. The central or core strand 13 is slightly larger in diameter than the strands in the two layers of strands 14 and strands 15 and 16 which are all of equal diameter.

In a preferred arrangement of this invention, the central strand 13 has a diameter of about 0.060 inch and outer layer strands 16 have a diameter of 0.0590 inch. Both strand 13 and strands 16 are composed of copper and have a tensile strength of 38,000 p.s.i. The remaining strands 14 and 15 have a diameter of about 0.0590 inch and are composed of high tensile strength steel having a tensile strength of 285,000 p.s.i. All the strands are circular in cross-section as shown by FIGURE 2. The jacket, i.e., covering 12 of FIGURE 1, is composed of polyethylene which has been extruded over the composite conductor to an outside diameter of 0.650 inch. The lays of both the inner and outer layers of strands are in the same direction, inner 2″ lay and outer 4″ lay.

Cross-sectional views of typical transition section cable conductors 20 and 30 constructed in accordance with the present invention for linking deep-sea cable 10 to conventional armored cable are respectively illustrated in FIGURES 3 and 4. In each case the central, i.e., core, strand 13 of conductor 11 extends into the transition section conductors 20 and 30 as also do the inner layer of steel strands 14. An intermediate additional layer of twelve high-tensile-strength steel strands 21 of the same cross-sectional dimension as strands 14 are laid about the inner layer of strands 14. Steel strands 15 and copper strands 16 of conductor 11 extend into conductors 20 and 30 and are laid about the intermediate layer of strands 21 forming part of the outer strand layers of conductors 20 and 30.

In the case of transition section conductor 20 shown in FIGURE 3, since eighteen strands are normally required in the third, outer layer of a three layer stranded cable, additional high-tensile-strength steel strands 22 of the same cross-sectional dimension and lay as strands 14, 15 and 21 are spliced into the third layer between alternate pairs of strands 15 and 16 which extend into transition section conductor 20 from conductor 10. Thus, in the outer, third layer of transition section conductor 20, each of the six copper strands 16 is separated from the next adjacent strand 16 by a steel strand 15 and a steel strand 21.

In the case of transition section conductor 30, which is alternatively used when the strength requirements are less than those imposed in the case of conductor 20 or when the conductivity requirements are higher or both, section conductor 30 differs from conductor 20 only in that three additional steel strands 31 and three additional copper strands 32 are added in the outer third layer of strands instead of the six strands 22, in such a manner that the copper strands including the original six strands 16 and the added three strands 32 alternate with the original six steel strands 15 and the added three steel strands 31.

In both cases, the transition section cables are completed by extending polyethylene insulation 12 over conductors 20 and 30 to a larger diameter, namely, 0.770 inch. Thus, as shown in FIGURE 5, the deep-sea armorless cable 10 leads directly to the transition cable section which in turn is connected in a conventional manner to the armored cable employed in shallow waters where physical disturbances can be expected. It is not essential that the strands forming the cable conductors of the deep-sea cable and transition sections be continuous from one cable to the next, but these can be spliced together by conventional methods or can be separated by repeaters and the like.

As indicated above the lay of the various strands 14, 15 and 16 in conductor 11, of strands 14, 21, 15, 16 and 22 in conductor 20 and of strands 14, 21, 15, 16, 31 and 32 in conductor 30 normally should have the same direction of lay as that of the armor wires of the armored cable to which cable 10 is connected. When desired, however, the tendency of the conductor to twist under tension can be lessened and even balanced out simply by applying the outer layer of strands with a lay opposite that of the inner layer or layers. Conductor 30 is particular illustrates a preferred conductor for a twist-free armorless cable having the other desirable electrical and mechanical properties described when the inner layers of steel strands 14 and 21 having the same direction of lay, while the alternating strands of copper (16 and 32) and of steel (15 and 31) have the opposite direction of lay.

Referring more particularly to FIGURE 6, there is shown a plot of transmission loss $a$ vs. frequency $f$ in the range presently encountered and contemplated for telegraphic work. The curve marked "Armored" shows the losses of a typical armored telegraph cable. The curve marked "Armorless" shows the losses of cable like the one in U.S. Patent No. 2,576,227 as well as the cable of this invention. It will be noted that the losses in the armorless cable, except at very low frequencies, are lower than those of the armored cable. This is due to the adverse electrical effect of the armor wire on the outside of the cable. The curve marked "Steel" shows the losses in a cable like that in this invention with the copper strands replaced with steel strands. The curve marked "Steel Over Copper" shows the losses of a cable similar to this invention with all the (7) copper strands in the core and the first layer and with all (12) steel strands in the outside layer.

The difference between the curves shows the beneficial effects of the copper strands in place of steel strands. The particular configuration of this invention utilizes the best arrangement of strands for the most economical method of obtaining low losses consistent with the required tensile-strength.

Although the cable and conductor construction of this invention have been described with respect to the employment of soft-drawn copper strands and high-tensile-strength steel strands, it will be appreciated that in the case of the copper strands any suitable highly-conductive non-ferrous alloy or elemental metal can be substituted, such as cadmium-copper and silver-copper alloys and aluminum. In order to obtain cable moduli on the order described, however, as a practical matter only high-tensile-strength ferrous metal strands can be employed where steel strands are specified.

I claim:

1. A composite, stranded conductor including a plurality of strands of wire, including a central strand of highly conductive non-ferrous metal, an inner layer of strands of high tensile strength ferrous metal laid about said central strand, and outer layer of strands of both a highly conductive non-ferrous metal and a high tensile strength ferrous metal laid about said inner layer, said strands in said outer layer formed of said highly conductive metal being symmetrically disposed relative to said central strand and being separated from each other by said ferrous metal strands in said outer layer, and each of said strands in said layers having a diameter slightly smaller than the diameter of said central strand.

2. The conductor of claim 1 wherein said highly conductive metal strands are composed of copper and said ferrous metal strands are composed of steel.

3. An armorless submarine telegraph cable having a centrally located composite, stranded conductor according to claim 1.

4. A conductor according to claim 1 in which the number of strands in said inner layer is six and the number of strands in said outer layer is twelve, six strands of said outer layer being said ferrous metal and six strands of said outer layer being of said highly conductive metal.

5. A conductor according to claim 1 which further includes an intermediate layer of strands of wire of a high tensile strength ferrous metal laid about said inner layer beneath said outer layer.

6. A conductor according to claim 1 in which the strands forming said outer layer have a lay opposite that of the strands forming said inner layer.

References Cited

UNITED STATES PATENTS

| 1,691,869 | 11/1928 | Fowle | 174—128 X |
| 1,904,116 | 4/1933 | Baum | 174—128 |
| 2,106,060 | 1/1938 | Ostrander | 174—108 |

FOREIGN PATENTS

| 304,031 | 1/1929 | Great Britain. |

LEWIS H. MYERS, *Primary Examiner.*

H. HUBERFELD, *Assistant Examiner.*